(12) United States Patent
Takenaka et al.

(10) Patent No.: US 9,360,561 B2
(45) Date of Patent: Jun. 7, 2016

(54) RADIATION IMAGING APPARATUS, RADIATION IMAGING SYSTEM, AND CONTROL METHOD FOR THE RADIATION IMAGING APPARATUS

(71) Applicant: CANON KABUSHIKI KAISHA, Tokyo (JP)

(72) Inventors: Katsuro Takenaka, Honjo (JP); Toshio Kameshima, Kumagaya (JP); Tomoyuki Yagi, Honjo (JP); Hideyuki Okada, Honjo (JP); Sho Sato, Saitama (JP); Atsushi Iwashita, Honjo (JP); Eriko Sugawara, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 350 days.

(21) Appl. No.: 13/833,781

(22) Filed: Mar. 15, 2013

(65) Prior Publication Data
US 2013/0264490 A1 Oct. 10, 2013

(30) Foreign Application Priority Data

Apr. 4, 2012 (JP) ................. 2012-085497

(51) Int. Cl.
| | | |
|---|---|---|
| *G01T 1/17* | (2006.01) | |
| *H04N 5/32* | (2006.01) | |
| *H04N 5/378* | (2011.01) | |
| *H04N 5/321* | (2006.01) | |
| *H04N 5/357* | (2011.01) | |

(52) U.S. Cl.
CPC .. *G01T 1/17* (2013.01); *H04N 5/32* (2013.01); *H04N 5/321* (2013.01); *H04N 5/357* (2013.01); *H04N 5/378* (2013.01)

(58) Field of Classification Search
CPC ............. G01T 1/17; G01T 1/16; G01T 1/247; H04N 5/32; H04N 5/378; H01L 27/14609; H01L 27/14658
USPC .................................................. 250/394
See application file for complete search history.

(56) References Cited

U.S. PATENT DOCUMENTS

| | | | |
|---|---|---|---|
| 2009/0121143 A1 | 5/2009 | Takenaka et al. | |
| 2011/0095169 A1* | 4/2011 | Takenaka et al. | .......... 250/208.1 |
| 2011/0317809 A1* | 12/2011 | Eguchi | ............................ 378/62 |

FOREIGN PATENT DOCUMENTS

| | | | |
|---|---|---|---|
| CN | 1890957 A | | 1/2007 |
| CN | 101057784 A | | 10/2007 |
| CN | 101744625 A | | 6/2010 |
| JP | 2006-153616 A | | 6/2006 |
| JP | 2010217141 A | * | 9/2010 |
| JP | 2010268171 A | | 11/2010 |
| JP | 2011-091771 A | | 5/2011 |

(Continued)

*Primary Examiner* — Marcus Taningco
(74) *Attorney, Agent, or Firm* — Canon USA Inc. IP Division

(57) ABSTRACT

A radiation imaging apparatus includes a pixel array including a plurality of pixels arranged in a matrix in which each pixel includes a conversion element configured to convert radiation into a charge and a switch element configured to transfer an electric signal based on the charge, a plurality of wirings arranged in the pixel array, and a detecting unit configured to detect radiation irradiation to the pixel array, in which the detecting unit includes a detecting circuit configured to detect the radiation irradiation to the pixel array on the basis of a plurality of currents flowing through the plurality of wirings detected for each of the plurality of wirings.

26 Claims, 8 Drawing Sheets

(56) References Cited

FOREIGN PATENT DOCUMENTS

| | | |
|---|---|---|
| JP | 2012-032645 A | 2/2012 |
| WO | 0006582 A1 | 2/2000 |
| WO | 2010/073894 A1 | 7/2010 |
| WO | 2011/001705 A1 | 1/2011 |

* cited by examiner

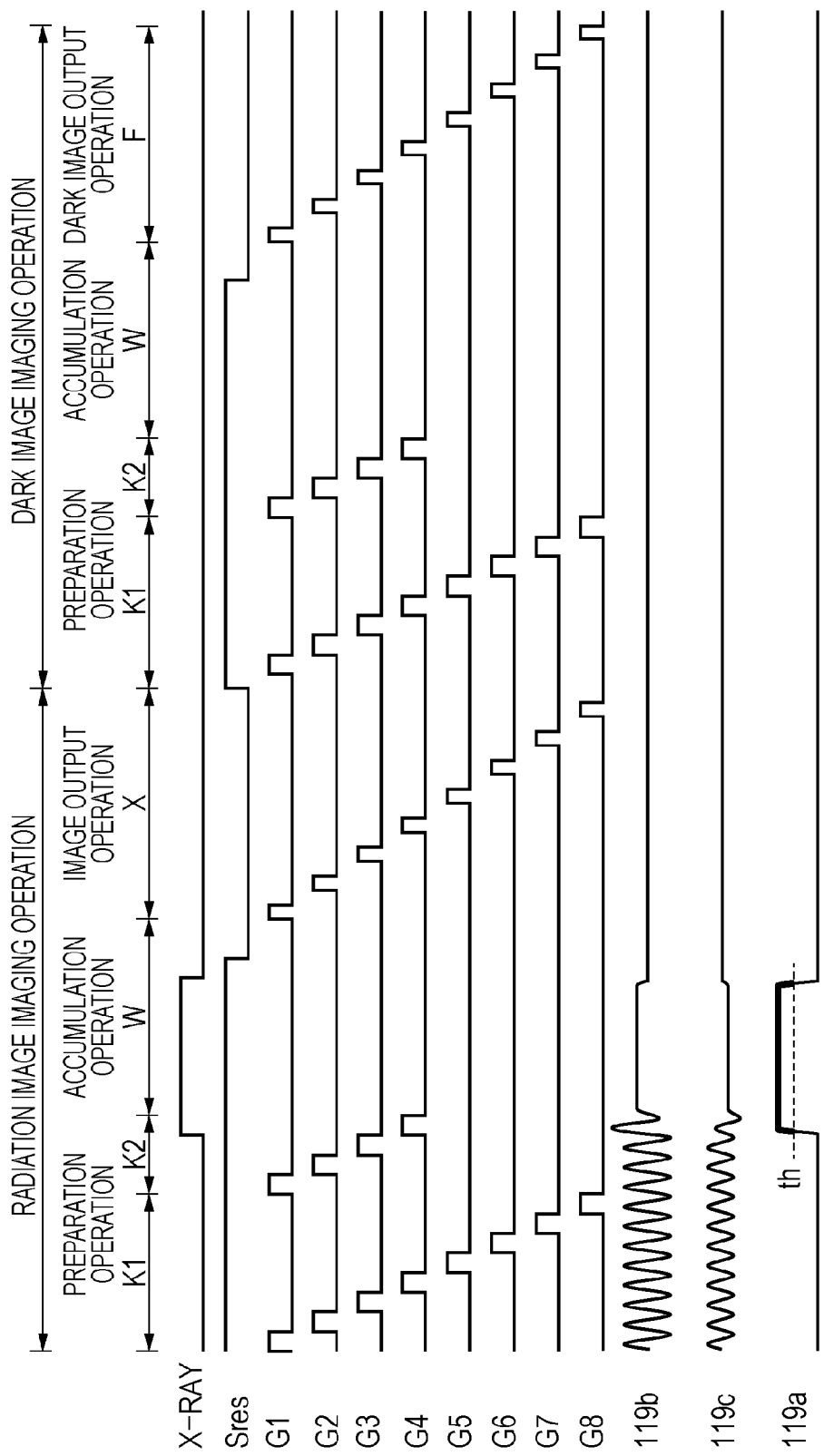

RADIATION IMAGING APPARATUS, RADIATION IMAGING SYSTEM, AND CONTROL METHOD FOR THE RADIATION IMAGING APPARATUS

BACKGROUND OF THE INVENTION

1. Field of the Invention

The present invention relates to a radiation imaging apparatus and a radiation imaging system used for a medical diagnosis and an industrial non-destructive test, and a control method for the radiation imaging apparatus. The invention particularly relates to a radiation imaging apparatus and a radiation imaging system with which it is possible to detect the presence or absence of radiation irradiation such as start or end of radiation irradiation from a radiation generation apparatus, and a control method for the radiation imaging apparatus.

2. Description of the Related Art

A radiation imaging apparatus using a flat panel detector (which will be abbreviated as FPD) performs an imaging operation in synchronism with radiation irradiation by a radiation generation apparatus. As proposed in International Publication No. WO 2000/06582, the following technique may be used as a technique for this synchronization. A current that flows through bias wiring where bias is supplied to a conversion element is detected while a conductive state and a non-conductive state of a switch element are switched to detect the radiation irradiation by the radiation generation apparatus. An operation of the radiation imaging apparatus is controlled in accordance with a result of the detecting. According to this synchronization technique, as proposed in Japanese Patent Laid-Open No. 2010-268171, a problem may occur that noise generated at the time of switching the conductive state and the non-conductive state of the switch element affects the current that flows through the wiring where the bias is supplied to the conversion element to decrease an accuracy of the detecting. To reduce the influence of this noise, Japanese Patent Laid-Open No. 2010-268171 describes the following suggestions. A first suggestion is to provide a filter circuit between a current detecting unit and the bias wiring. A second suggestion is to provide a sample and hold circuit to an output terminal of the current detecting unit and perform processing of interrupting sample and hold at a timing of switching the conductive state and the non-conductive state of the switch element. A third suggestion is to perform differential processing of a noise waveform previously obtained and stored in a storage unit from the noise-affected current. A fourth suggestion is to align a timing of supplying the switch element with a non-conductive voltage for setting the switch element as the non-conductive state on a certain row with a timing of supplying the switch element with a conductive voltage for setting the switch element as the conductive state on another row to cancel the noise.

However, to detect the presence or absence of the radiation irradiation with a still higher instantaneousness and also at a high accuracy, the suggestions of Japanese Patent Laid-Open No. 2010-268171 are insufficient. According to the first suggestion, a problem of the detecting instantaneousness occurs since a band limitation of the filter circuit is set in accordance with a timing of the switching timing, and a delay is increased. According to the second suggestion, the problem of the detecting instantaneousness occurs since the detecting is not conducted until a resumption of the sample and hold in a case where the radiation irradiation is started during the interruption of the sample and hold. According to the third and fourth suggestions, a problem of the detecting accuracy occurs since variations in resistances and capacitances of wirings in a pixel array and variations in characteristics and performances of the switch elements cause variations in noise waveforms in a pixel array, and it is difficult to sufficiently reduce the noise influence.

SUMMARY OF THE INVENTION

According to an aspect of the present invention, there is provided a radiation imaging apparatus including: a pixel array including a plurality of pixels arranged in a matrix in which each pixel includes a conversion element configured to convert radiation into a charge and a switch element configured to transfer an electric signal based on the charge; a plurality of wirings arranged in the pixel array; and a detecting unit configured to detect radiation irradiation to the pixel array, in which the detecting unit includes a detecting circuit configured to detect the radiation irradiation to the pixel array on the basis of a plurality of currents flowing through the plurality of wirings detected for each of the plurality of wirings.

According to the aspects of the present invention, it is possible to provide the radiation imaging apparatus that may detect the presence or absence of the radiation irradiation with a high instantaneousness and also at a high accuracy.

Further features of the present invention will become apparent from the following description of exemplary embodiments with reference to the attached drawings.

BRIEF DESCRIPTION OF THE DRAWINGS

FIG. 5 is a timing chart for the radiation imaging apparatus according to the first exemplary embodiment.

DESCRIPTION OF THE EMBODIMENTS

Hereinafter, exemplary embodiments of the present invention will be described with reference to the drawings. Radiation in the present invention includes alpha rays, beta rays, gamma rays, and the like corresponding to beams made of particles (including photons) released from radiation decay as well as beam having comparable energy or above such as X-rays, particle rays, and cosmic rays.

First Exemplary Embodiment

Figure 1A:
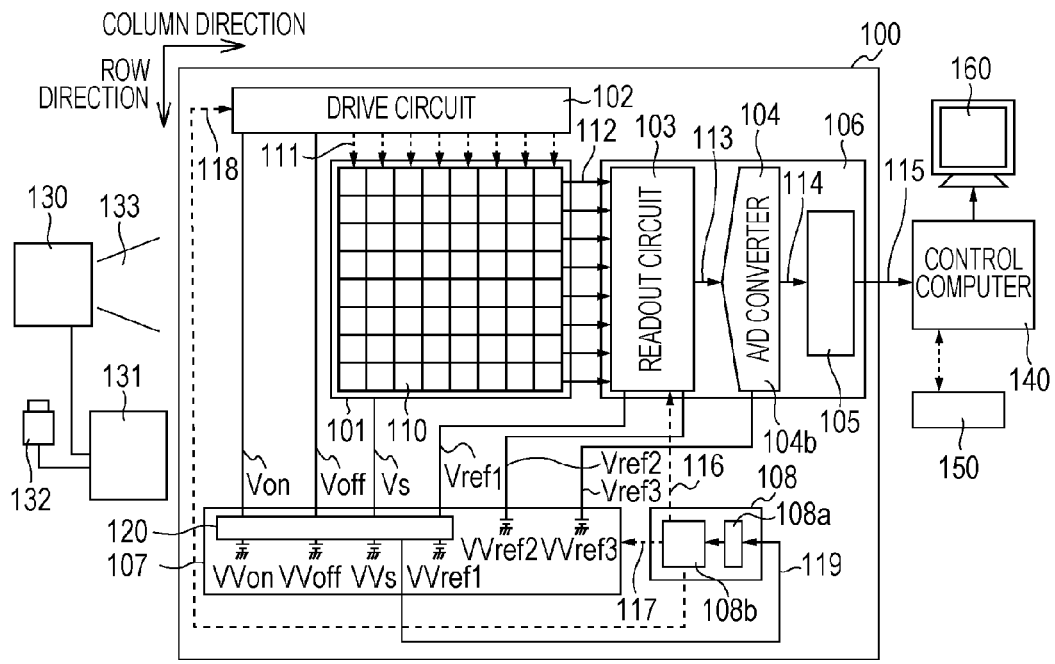
FIG. 1A is a schematic diagram of a radiation imaging apparatus and system.
Figure 1B:
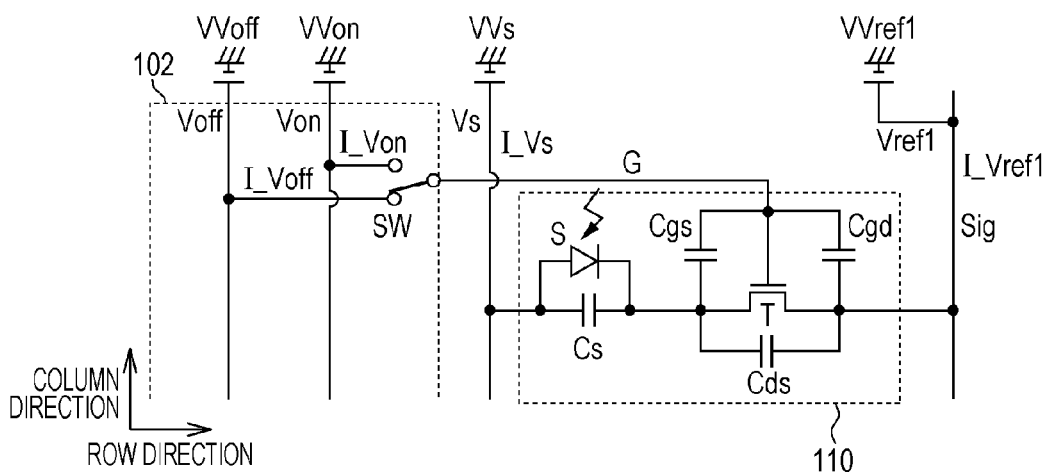
FIG. 1B is a schematic equivalent circuit diagram of a radiation imaging apparatus for one pixel according to a first exemplary embodiment.

A concept of the present invention will be described by using FIG. 1B. FIG. 1B illustrates a schematic equivalent circuit of one pixel in a pixel array provided with plural pixels in a matrix according to a first exemplary embodiment of the present invention. The pixel array herein refers to an area including an area where plural pixels are arranged and an area between the plural pixels on a substrate where the plural pixels are arranged in a matrix. One pixel 110 illustrated in FIG. 1B includes a conversion element S that is provided with a semiconductor layer between two electrodes and configured to convert radiation into a charge and a switch element T configured to transfer an electric signal in accordance with the charge. An indirect-type conversion element provided with a photoelectric conversion element and a wavelength conversion body configured to convert radiation into light in a spectrum band that may be detected by the photoelectric conversion element or a direct-type conversion element configured to directly convert radiation into a charge is preferably used for the conversion element S. According to the present exemplary embodiment, a PIN-type photo diode that is arranged on an insulating substrate such as a glass substrate and contains amorphous silicon as a main material is used for a photo diode as one type of the photoelectric conversion element. The conversion element S herein has a capacity, and the capacity of the conversion element S is denoted by Cs. A transistor including a control terminal and two main terminals is preferably used for the switch element T, and according to the present exemplary embodiment, a thin film transistor (TFT) is used. One electrode (first electrode) of the conversion element S is electrically connected to one of the two main terminals of the switch element T, and the other electrode (second electrode) is electrically connected to a bias power supply VVs for supplying a bias voltage via a bias wiring Vs. A control terminal of the switch element T configured to transfer an electric signal in accordance with a potential at the first electrode of the conversion element S is connected to a drive wiring G, and a drive signal including a conductive voltage for setting the switch element T as a conductive state and a non-conductive voltage for setting the switch element T as a non-conductive state is supplied from a drive circuit 102 via the drive wiring G. According to the present exemplary embodiment, one main terminal of the switch element T is connected to the first electrode of the conversion element S, and the other main terminal is connected to a signal wiring Sig. While the control terminal is supplied with the conductive voltage to set the switch element T as the conductive state, the switch element T transfers the electric signal in accordance with the potential at the first electrode which varies in accordance with the charge generated in the conversion element S to the signal wiring Sig. The switch element T has a capacity between the control terminal and the one main terminal, and the capacity is denoted as Cgd. The switch element T also has a capacity between the control terminal and the other main terminal, and the capacity is denoted as Cgs. The switch element T further has a capacity between the two terminals, and the capacity is denoted as Cds. The signal wiring Sig is connected to a reference power supply VVref1 via a reference voltage wiring Vref1 for supplying a reference voltage to a readout circuit 103 which will be described below. The drive wiring G is selectively connected, through a switch SW provided on the drive circuit 102, to a conductive power supply VVon via a conductive voltage wiring Von for supplying the conductive voltage and a non-conductive power supply VVoff via a non-conductive voltage wiring Voff for supplying the non-conductive voltage.

A current that flows when the conversion element S is irradiated with radiation will be described.

A case in which the switch element T is in the non-conductive state and the conversion element S is irradiated with the radiation will be described first. Currents flow through the respective wirings in accordance with the generate electron-hole pair, the capacity Cs of the conversion element S, and the respective capacities (Cgs, Cgd, and Cds) of the switch element T. The potential at the first electrode of the conversion element S decreases in accordance with the generated charge. Thus, a non-conductive power supply current I_Voff flows as a drive wiring current I_Vg from the non-conductive power supply VVoff towards the pixel 110 through the drive wiring G in accordance with a decreased amount of the potential at the first electrode and a capacity division ratio from the conversion element S to the drive wiring G. A signal wiring current I_Vref1 flows the reference power supply VVref1 towards the pixel 110 through the signal wiring Sig from in accordance with a decreased amount of the potential at the first electrode and a capacity division ratio from the conversion element to the signal wiring Sig. A bias wiring current I_Vs equivalent to a sum of the drive wiring current I_Vg flowing towards the pixel and the signal wiring current I_Vref1 flows from the pixel 110 towards the bias power supply VVs so that a potential difference of the capacity Cs of the conversion element S is maintained through the bias wiring Vs.

A case in which the switch element T is in the conductive state and the conversion element S is irradiated with the radiation will be described next. The bias wiring current I_Vs flows from the pixel 110 towards the bias power supply VVs through the bias wiring Vs in accordance with the generated hole. The signal wiring current I_Vref1 corresponding to a value obtained by dividing the bias wiring current I_Vs by a product of the capacity Cs of the conversion element S and an on resistance value Ron of the switch element T flows from the reference power supply VVref1 towards the pixel 110 through the signal wiring Sig. At this time, a potential difference corresponding to a product of the signal wiring current I_Vs and the on resistance Ron of the switch element T is generated between a potential Vref1 at the signal wiring Sig and a potential at the first electrode of the conversion element S. A conductive power supply current I_Von flows from the conductive power supply VVon towards the pixel 110 through the drive wiring G as the drive wiring current I_Vg to cancel the potential difference.

A current that flows when the conductive state and the non-conductive state of the switch element T are switched will be described.

A current that flows when the non-conductive state of the switch element T is switched to the conductive state will be described first. The conductive power supply current I_Von flows from the conductive power supply VVon towards the pixel 110 as the drive wiring current I_Vg through the drive wiring G to compensate a potential fluctuation amount between the non-conductive voltage and the conductive voltage. The bias wiring Vs has capacity coupling via the capacity Cs of the conversion element S and the capacity Cgd between the control terminal of the switch element T and the one main terminal. For that reason, the bias wiring current I_Vs flows from the pixel 110 towards the bias power supply VVs through the bias wiring Vs in accordance with a potential fluctuation amount of the driving wiring G and a capacity division ratio from the driving wiring G to the bias wiring Vs. The signal wiring Sig has capacity coupling via the capacity Cgs between the control terminal of the switch element T and the other main terminal. For that reason, the signal wiring current I_Vref1 flows from the pixel 110 towards the reference power supply VVref1 through the signal wiring Sig in accordance with the potential fluctuation amount of the drive wiring G and a capacity division ratio from the drive wiring G to the signal wiring Sig.

A current that flows when the conductive state of the switch element T is switched to the non-conductive state will be described next. The non-conductive power supply current I_Voff flows from the pixel 110 towards the non-conductive power supply VVoff as the drive wiring current I_Vg to cancel the potential fluctuation amount between the conductive voltage and the non-conductive voltage. The bias wiring current I_Vs flows from the bias power supply VVs towards the pixel 110 through the bias wiring Vs in accordance with a potential fluctuation amount of the driving wiring G and a capacity division ratio from the driving wiring G to the bias wiring Vs. The signal wiring current I_Vref1 flows from the reference power supply VVref1 towards the pixel 110 through the signal wiring Sig in accordance with the potential fluctuation amount of the drive wiring G and a capacity division ratio from the drive wiring G to the signal wiring Sig.

In a case where the conversion element S is irradiated with the radiation in this manner, currents flow through various wirings arranged in the pixel array 101 so that the current flowing towards the pixel 110 and the current flowing from the pixel 110 are equal to each other. When the conductive state and the non-conductive state of the switch element T are switched, the current in accordance with a capacity division ratio of the path flows through the wiring arranged in the pixel array 101 with capacity coupling with the drive wiring G in a direction opposite to the drive wiring current I_Vg. This current exerts an influence as noise and decreases an accuracy for the detecting of the radiation irradiation.

In view of the above, the inventor of the present application finds out the following as a result of earnest examinations. Plural currents flowing through plural wirings arranged in the pixel array 101 are first respectively detected for the plural wirings. The wirings arranged in the pixel array 101 herein include the bias wiring Vs, the drive wiring Vg, and coupling wirings such as the signal wiring Sig with capacity coupling with the drive wiring Vg separately other than the bias wiring Vs. The plural wirings arranged in the pixel array may be the plural bias wirings Vs, the plural drive wirings Vg, or the plural coupling wirings. The plural detected currents each contain the current that serves as the noise component and flows in the above-described direction in accordance with the capacity division ratio from the drive wiring Vg. By conducting the computation on the basis of the values of the plural detected currents while the direction of these currents and the capacity division ratio are taken into account, it is possible to increase the signal amount while the noise component contained in each of the plural detected currents is suppressed. To elaborate, the presence or absence of the radiation irradiation such as the start or end of the radiation irradiation to the pixel array 101 is detected on the basis of the values of the plural detected currents flowing through the plural wirings. According to this, it is possible to suppress the decrease in the detecting accuracy caused by the noise component.

In the configuration of FIG. 1B, for example, when the conductive state and the non-conductive state of the switch element T are switched, the bias wiring current I_Vs flows towards the pixel 110 by the amount represented in the following expression in accordance with the capacity division ratio from the drive wiring G.

$$I\_Vs = (Cgd \times Cs/(Cgd+Cs))/(Cgd \times Cs/(Cgd+Cs)+Cgs) \times I\_Vg = G1 \times I\_Vg$$

The signal wiring current I_Vref1 flows towards the pixel 110, in other words, in the same direction as the bias wiring current I_Vs, by the amount represented in the following expression in accordance with the capacity division ratio from the drive wiring G.

$$I\_Vref1 = Cgs/((Cgd \times Cs/(Cgd+Cs))+Cgs) \times I\_Vg = G2 \times I\_Vg$$

For that reason, the bias wiring current I_Vs and the signal wiring current I_Vref1 at a time when the conductive state and the non-conductive state of the switch element T are switched have the following relationship.

$$I\_Vs = ((Cgd \times Cs/(Cgd+Cs))/Cgs) \times I\_Vref1 = G3 \times I\_Vref1$$

Thus, it is possible to suppress the noise component at a time when the conductive state and the non-conductive state of the switch element T are switched by conducting computation processing of multiplying the signal wiring current I_Vref1 by a previously determined coefficient G3 and subtracting the resultant from the bias wiring current I_Vs. When the conversion element S is irradiated with the radiation, the signal wiring current I_Vref1 flows towards the pixel 110, and the bias wiring current I_Vs flows in a direction away from the pixel 110. The directions are opposite from each other, and polarities of the currents are therefore opposite from each other. For that reason, by conducting the computation processing through the multiplication by the coefficient G3 and the subtraction as described above, the signal amount obtained through the computation is increased. In this manner, it is possible to increase the signal amount while the noise component contained in the detected current is suppressed by conducting the computation on the basis of the values of the plural detected currents flowing through the plural wirings while the current direction and the capacity division ratio are taken into account.

A radiation imaging system and a radiation imaging according to the exemplary embodiment of the present invention will be described next by using FIG. 1A. A radiation imaging apparatus 100 includes the pixel array 101 where the plural pixels 110 are arranged in the pixel, the drive circuit 102 configured to drive the pixel array 101, and a signal processing unit 106 including the readout circuit 103 configured to read out an image signal based on the electric signal from the driven pixel array 101. The signal processing unit 106 includes the readout circuit 103, an A/D converter 104, and a digital signal processing unit 105. According to the present exemplary embodiment, to simplify the description, the pixel array 101 includes the pixels 110 arranged in eight rows and eight columns. The pixel array 101 is driven in accordance with a drive signal 111 from the drive circuit 102, and electric signals 112 are output in parallel from the pixel array 101. The electric signal 112 output from the pixel array 101 is read out by the readout circuit 103. An electric signal 113 from the readout circuit 103 is converted from an analog signal to a digital signal 114 by the A/D converter 104. The digital signal from the A/D converter 104 is subjected to simple digital signal processing such as digital multiplex processing or offset correction by the digital signal processing unit 105, and a digital image signal 115 is output. The radiation imaging apparatus 100 includes a power supply unit 107 and a control unit 108 configured to supply control signals to the respective components to control operations. The power supply unit 107 includes a first reference power supply VVref1 that supplies the reference voltage to the readout circuit 103 via the reference voltage wiring Vref1 and a second reference power supply VVref2 that supplies the reference voltage via a reference voltage wiring Vref2. The power supply unit 107 includes a third reference power supply VVref3 that supplies the reference voltage to the A/D converter 104 via a reference voltage wiring Vref3. The power supply unit 107 also includes the conductive power supply VVon for supplying the conductive voltage to the drive circuit 102 via the conductive voltage wiring Von and the non-conductive power supply VVoff for supplying the non-conductive voltage via the non-conductive voltage wiring Voff. The power supply unit 107 further includes the bias power supply VVs for supplying the bias voltage. The control unit 108 controls the drive circuit 102, the readout circuit 103, and the power supply unit 107. The power supply unit 107 herein includes a current detection circuit 120 configured to detect currents flowing through plural wirings arranged in the pixel array 101. The current detection circuit 120 according to the present exemplary embodiment detects at least two of the current flowing through the drive wiring G, the current flowing through the bias wiring Vs, and the current flowing through the signal wiring Sig serving as the coupling wiring that has the capacity coupling with the drive wiring G. The current detection circuit 120 according to the present exemplary embodiment thus may detect at least two of the current flowing through the bias wiring Vs, the current flowing through the reference voltage wiring Vref1, and the current flowing through the conductive voltage wiring Von or the non-conductive voltage wiring Voff. The control unit 108 includes a detecting circuit 108a configured to detect the start of radiation irradiation to the pixel array 101 on the basis of the current detected by the current detection circuit 120 and a control circuit 108b configured to control the drive circuit 102 on the basis of the detecting result of the detecting circuit 108a. A detecting unit according to the exemplary embodiment of the present invention includes the current detection circuit 120 and the control circuit 108b and detects at least the start of radiation irradiation to the pixel array 101. The detecting unit will be described in detail below.

A radiation control apparatus 131 performs a control on an operation for a radiation generation apparatus 130 to emit radiation 133 in response to a control signal from an exposure button 132. A control console 150 inputs information on a subject and an imaging condition to a control computer 140 to be transmitted to the control computer 140. A display apparatus 163 displays image data subjected to image processing by the control computer 140 that has received the image data from the radiation imaging apparatus 100.

Figure 2A:
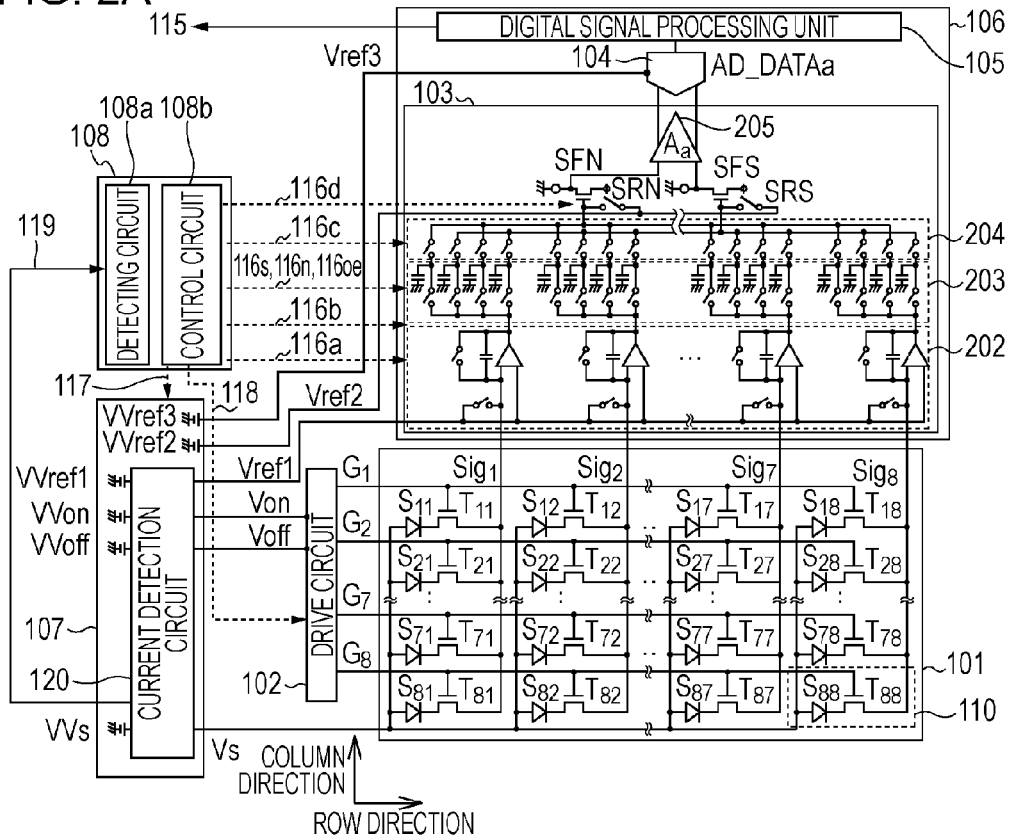
FIG. 2A and FIG. 2B are schematic equivalent circuit diagrams of the radiation imaging apparatus according to the first exemplary embodiment.
Figure 2B:
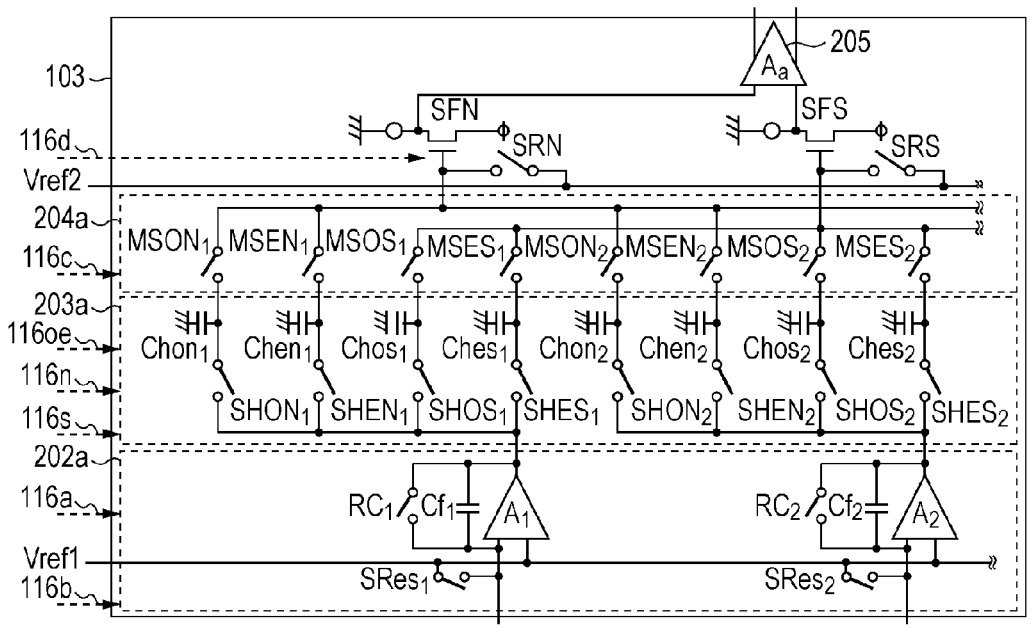

A radiation imaging apparatus according to the present exemplary embodiment will be described next by using FIG. 2A and FIG. 2B. FIG. 2A is a schematic equivalent circuit diagram of the radiation imaging apparatus according to the present exemplary embodiment, and FIG. 2B is a schematic equivalent circuit diagram of the readout circuit 103. Configurations that are same as the configurations described by using FIG. 1A and FIG. 1B are assigned by the same reference signs, and a detailed description thereof will be omitted.

In the switch elements of the plural pixels in the row direction, for example, which are denoted by $T_{11}$ to $T_{18}$, the control terminals thereof are commonly electrically connected to the driving wiring $G_1$ on the first row, and the drive signals from the drive circuit 102 are provided in units of row via the drive wiring $G_1$. In the switch elements of the plural pixels in the column direction, for example, which are denoted by $T_{11}$ to $T_{81}$, the other main terminals thereof are electrically connected to the signal wiring $Sig_1$ on the first column. While the conductive state is established, the electric signal in accordance with the charge of the conversion element S is transferred to the readout circuit 103 via the signal wiring Sig. The electric signals output from the plural pixels 110 in the pixel array 101 are transmitted in parallel to the readout circuit 103 through the plural signal wirings $Sig_1$ to $Sig_8$ arranged in the column direction.

The readout circuit 103 includes an amplification circuit unit 202 configured to amplify the electric signals output in parallel from the pixel array 101 and a sample and hold circuit unit 203 that samples and holds the electric signals from the amplification circuit unit 202. The amplification circuit unit 202 includes amplification circuits including an operational amplifier A configured to amplify and output the read electric signal, an integral capacity group Cf, and a reset switch RC configured to reset the integral capacity while corresponding to the respective signal wirings Sig. The output electric signal is input to an inverting input terminal of the operational amplifier A, and the amplified electric signal is output from an output terminal. The reference voltage wiring Vref1 herein is connected to a non-inverting input terminal of the operational amplifier A. The amplification circuit unit 202 is provided with a signal wiring reset switch SRes configured to connect the reference voltage wiring Vref1 to the signal wiring Sig until the start of the radiation irradiation is detected. Until the start of the radiation irradiation is detected, the power consumption is increased when the operational amplifier A is operated, and therefore the operation by the operational amplifier A is stopped. To fix the voltage of the signal wiring Sig to the reference voltage and also detect (monitor) the current flowing through the signal wiring Sig, the signal wiring reset switch SRes connects the reference voltage wiring Vref1 to the signal wiring Sig. The sample and hold circuit unit 203 includes four systems of a sample and hold circuit composed of a sampling switch SH and a sampling capacity Ch while corresponding to the respective amplification circuits. This is because correlated double sampling (CDS) processing of suppressing the offset generated in the amplification circuit is conducted while corresponding to the electric signals for two rows. The readout circuit 103 includes a multiplexer 204 configured to sequentially output the electric signals read out in parallel from the sample and hold circuit unit 203 as image signals in the form of serial signals. The readout circuit 103 further includes an output buffer circuit SF configured to perform impedance conversion on the image signal to be output, an input reset switch SR configured to reset an input of the output buffer circuit SF, and a variable amplifier 205. The multiplexer 204 herein is provided with switches MS1 to MS8 and switches MN1 to MN8 while corresponding to the respective signal wirings, and the operation of converting the parallel signals to the serial signals is conducted by sequentially selecting the switches. A fully-differential amplifier is preferably used as a differential amplifier for the CDS processing for the variable amplifier 205. The signals converted into the serial signals are input to the A/D converter 104 and converted into digital data by the A/D converter 104, and the digital data is sent to the digital signal processing unit 105. A control circuit 108b herein supplies a control signal 116a to the reset switch RC of the amplification circuit unit 202 and supplies a control signal 116b to the signal wiring reset switch SRes. The control circuit 108b also supplies an even-odd selection signal 116oe, a signal sample control signal 116s, and an offset sample control signal 116n to the sample and hold circuit unit 203. The control circuit 108b further supplies a control signal 116c to the multiplexer 204 and supplies a control signal 116d to the input reset switch SR.

Examples of the current detection circuit 120 and the detecting circuit 108a according to the present exemplary embodiment will be described by using FIGS. 3A and 3B and FIGS. 4A and 4B.

The current detection circuit 120 includes at least two types among three types including a bias wiring current detection mechanism 121a, a signal wiring current detection mechanism 121b, and a pair of a conductive power supply current detection mechanism 121c and a non-conductive power supply current detection mechanism 121d. The bias wiring current detection mechanism 121a is configured to detect the bias wiring current I_Vs and output a bias wiring current signal 119b. The signal wiring current detection mechanism 121b is configured to detect the signal wiring current I_Vref1 and output a signal wiring current signal 119c. The conductive power supply current detection mechanism 121c is configured to detect the conductive power supply current I_Von and output a conductive power supply current signal 119d. The non-conductive power supply current detection mechanism 121d is configured to detect the non-conductive power supply current I_Voff and output the non-conductive power supply current signal 119e. The conductive power supply current detection mechanism 121c and the non-conductive power supply current detection mechanism 121d constitute a mechanism of detecting the drive wiring current I_Vg. At least two signals among the three including the bias wiring current signal 119b, the signal wiring current signal 119c, the conductive power supply current signal 119d, and the pair of the non-conductive power supply current signal 119e are output to the detecting circuit 108a according to the present exemplary embodiment. The respective current detection mechanisms include a current voltage conversion circuit 122. According to the present exemplary embodiment, the current voltage conversion circuit 122 includes a transimpedance amplifier TA and a feedback resistance Rf. One of the respective power supplies is connected to a non-inverting input terminal of the transimpedance amplifier TA. One of the wirings is connected to an inverting input terminal of the transimpedance amplifier TA. The feedback resistance Rf is connected to the transimpedance amplifier TA in parallel between the output terminal and the non-inverting input terminal. The respective current detection mechanisms according to the present exemplary embodiment also include a voltage amplification circuit 123 configured to amplify the output voltage of the current voltage conversion circuit 122. According to the present exemplary embodiment, the voltage amplification circuit 123 includes an instrumentation amplifier IA and a gain setting resistance Rg. The respective current detection mechanisms according to the present exemplary embodiment further include a band limitation circuit 124 for noise reduction and an AD converter 125 configured to perform an analog digital conversion and output respective digital current signals.

The detecting circuit 108a includes a computation circuit 126 configured to compute values of at least two currents detected in the current detection circuit 120 and a comparison circuit 127 configured to compare the output of the computation circuit 126 with a threshold Vth to output a comparison result 119a. The computation circuit 126 according to the present exemplary embodiment is configured to perform computation processing on at least two signals among the bias wiring current signal 119b, the signal wiring current signal 119c, and a pair of the conductive power supply current signal 119d and the non-conductive power supply current signal 119e. The comparison circuit 127 according to the present exemplary embodiment includes a comparator CMP configured to compare the output of the computation circuit 126 with the previously set threshold Vth. A computation circuit 126 illustrated in FIG. 3A includes a variable amplifier VGA configured to amplify the signal wiring current signal 119c by a wanted amplification factor (coefficient) G3 and a subtractor SUB configured to perform differential processing on the bias wiring current signal 119b and the amplified signal wiring current signal 119c. The computation circuit 126 illustrated in FIG. 3B includes the variable amplifier VGA that amplifies the signal wiring current signal 119c by a wanted amplification factor (coefficient) 1/G1 and a first adder ADD1 configured to add the conductive power supply current signal 119d to the non-conductive power supply current signal 119e. The computation circuit 126 illustrated in FIG. 3B further includes a second adder ADD2 configured to add the amplified signal wiring current signal 119c to an output signal of the first adder ADD1. The output signal of the first adder ADD1 herein is equivalent to a drive wiring current detecting signal in which the drive wiring current I_Vg is detected. The computation circuit 126 illustrated in FIG. 4A includes the variable amplifier VGA that amplifies the bias wiring current signal 119b by a wanted amplification factor (coefficient) 1/G2 and the first adder ADD1 that adds the conductive power supply current signal 119d to the non-conductive power supply current signal 119e. The computation circuit 126 illustrated in FIG. 4A further includes a third adder ADD3 configured to add the amplified bias wiring current signal 119b to the output signal of the first adder ADD1. The computation circuit 126 illustrated in FIG. 4B includes the variable amplifier VGA that amplifies the signal wiring current signal 119c by a wanted amplification factor and the subtractor SUB that performs differential processing on the bias wiring current signal 119b and the amplified signal wiring current signal 119c. The computation circuit 126 illustrated in FIG. 4B also includes the first adder ADD1 that adds the conductive power supply current signal 119d to the non-conductive power supply current signal 119e and the second adder ADD2 that adds the amplified signal wiring current signal 119c to the output signal of the first adder ADD1. In the computation circuit 126 illustrated in FIG. 4B, two types of outputs are output. The comparison circuit 127 illustrated in FIG. 4B includes two types of thresholds, two comparators CMP, and an AND circuit used to improve an accuracy for detection results from the two comparators CMP in accordance with the respective outputs. In a case where the detection speed for the current is to be improved, an OR circuit may be used instead of the AND circuit. The comparison result 119a which is the detecting result of the detecting circuit 108a is supplied to the control circuit 108b, and the control circuit 108b performs the control on the drive circuit 102 on the basis of the comparison result 119a. The description has been made while the signals obtained by converting the detected currents into the voltages are used in both the current detection circuit 120 and the detecting circuit 108a, but the embodiment of the present invention is not limited to this configuration. The current detection circuit 120 and the detecting circuit 108a according to the exemplary embodiment of the present invention may also use the detected currents without the conversion.

Figure 3A:
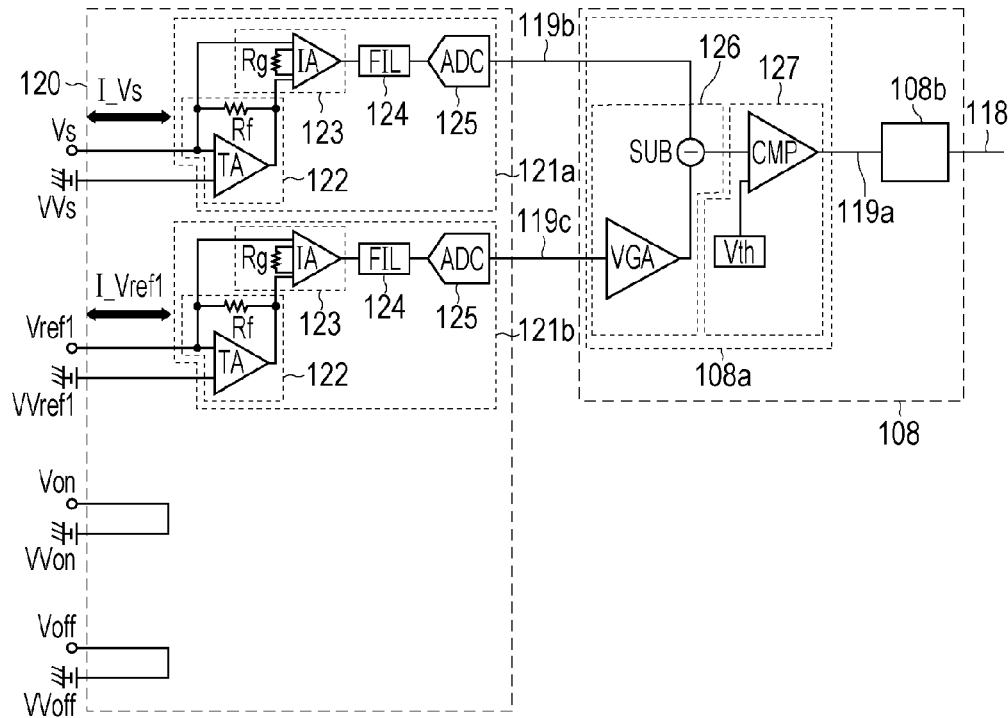
FIGS. 3A and 3B are schematic equivalent circuit diagrams of a detection circuit and a detecting circuit.
Figure 3B:
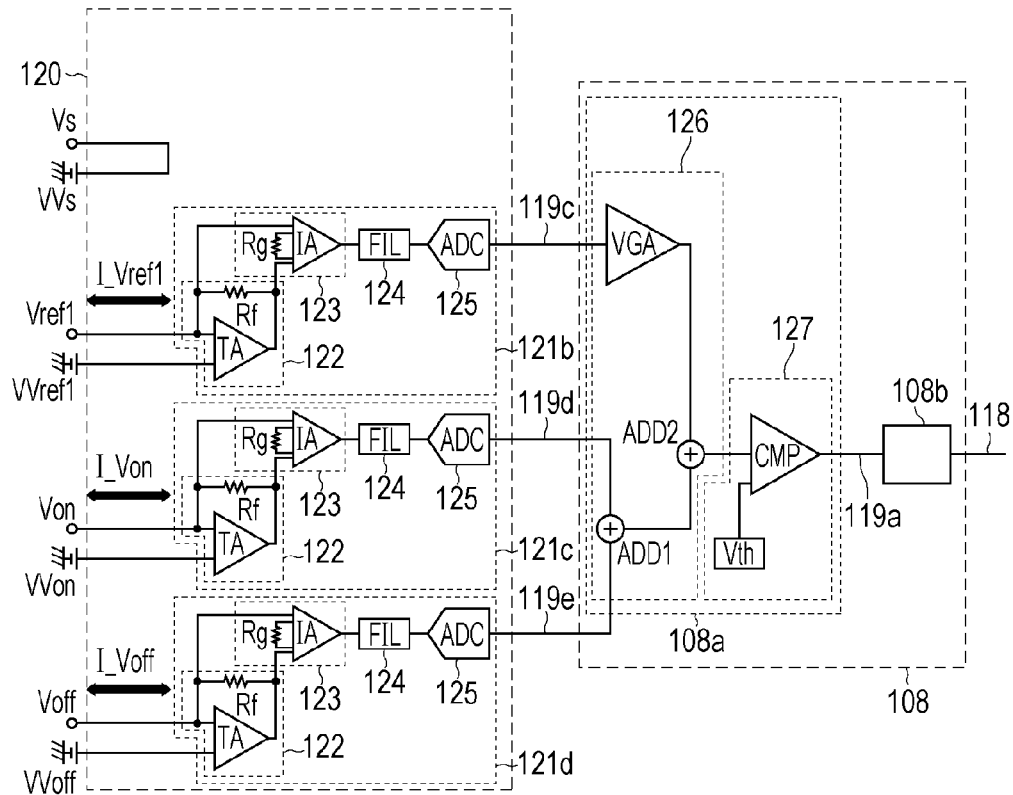
Figure 4A:
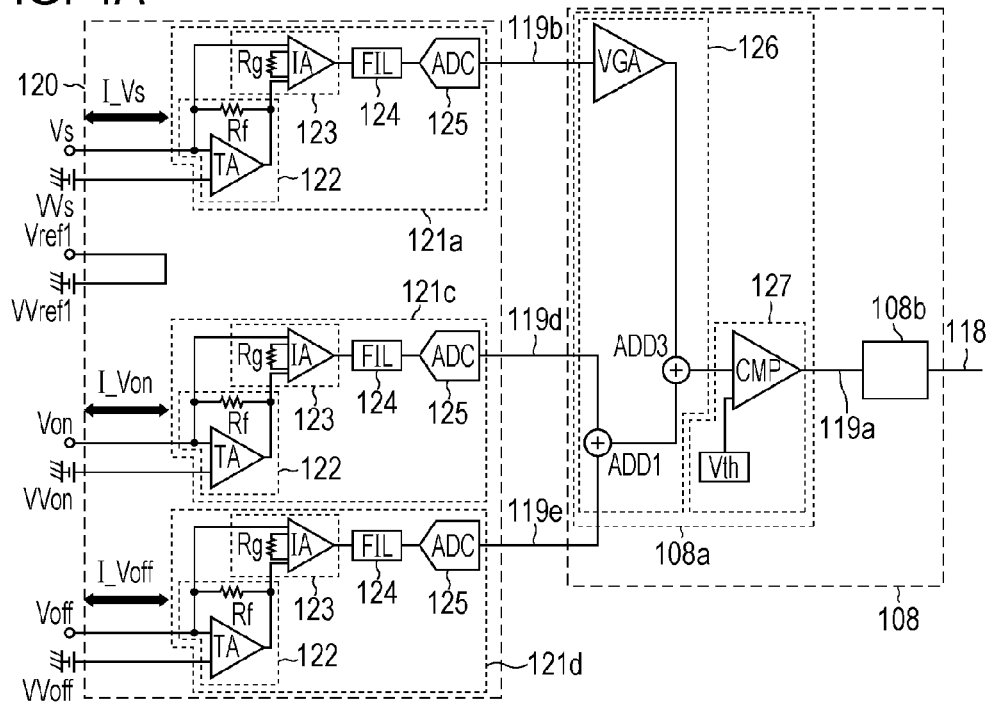
FIGS. 4A and 4B are schematic equivalent circuit diagrams of the detection circuit and the detecting circuit.
Figure 4B:
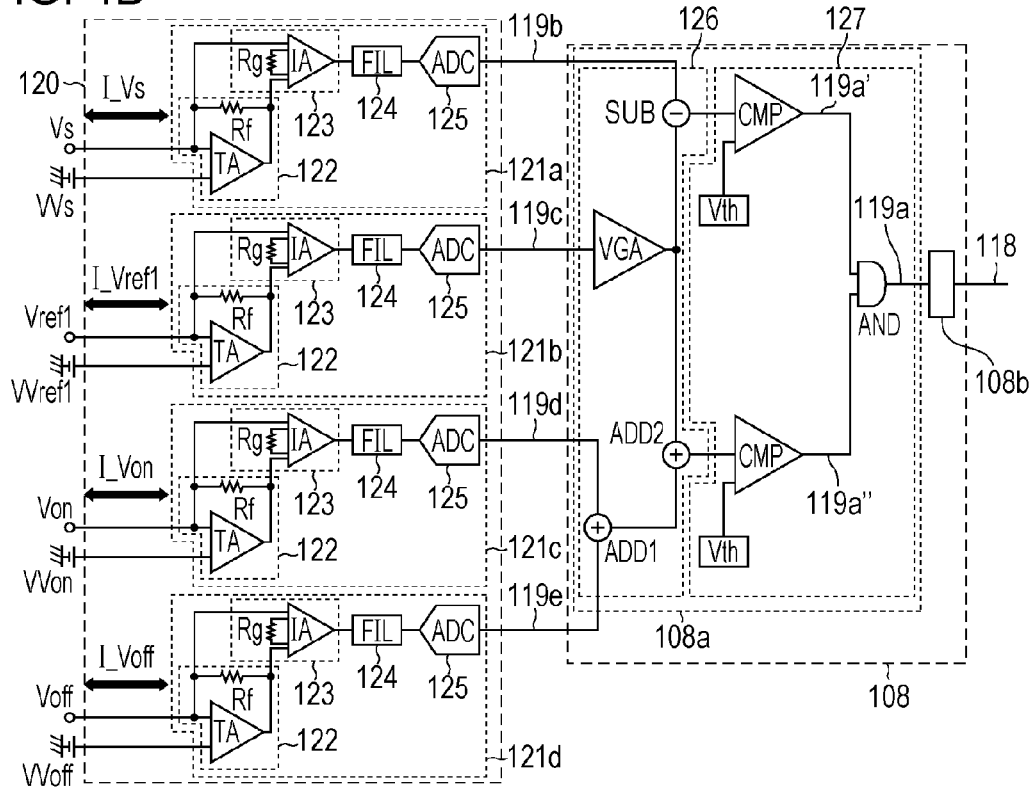

Detecting of radiation exposure and a control based on the detecting according to the present exemplary embodiment will be described next by using FIG. 2A, FIG. 3A, and FIG. 5. FIG. 5 illustrates the example using the current detection circuit 120 and the detecting circuit 108a illustrated in FIG. 3A.

In a radiation image imaging operation, the control unit 108 first supplies a control signal 117 to the power supply unit 107 and the current detection circuit 120. The power supply unit 107 and the current detection circuit 120 supply a bias voltage to the pixel array 101, supply a conductive voltage and a non-conductive voltage to the drive circuit 102, and supply respective reference voltages to the readout circuits 103. The control unit 108 supplies a control signal 118 to the drive circuit 102, and the drive circuit 102 outputs drive signals so that the conductive voltages are sequentially supplied to the respective driving wirings G1 to G8. An initialization operation K1 is conducted in which all the switch elements T are sequentially set as the conductive state in units of row, and the initialization operation K1 is conducted by plural times until the start of the radiation exposure is detected. At that time, the control unit 108 supplies the control signal 116b to the signal wiring reset switch SRes of the readout circuit 103 to set the signal wiring reset switch SRes as the conductive state. The first reference power supply VVref1 of the power supply unit 107 and the signal wiring Sig are set as the conductive state. During a preparation operation including the initialization operation K1, the current detection circuit 120 detects the bias wiring current I_Vs and the signal wiring current I_Vref1 and outputs the bias wiring current signal 119b and the signal wiring current signal 119c to the detecting circuit 108a. The computation circuit 126 performs the above-described computation processing on the bias wiring current signal 119b and the signal wiring current signal 119c, and the comparison circuit 127 compares the output of the computation circuit 126 with the threshold Vth and outputs the comparison result 119a to the control circuit 108b. When the output of the computation circuit 126 exceeds the threshold Vth, the comparison result 119a indicating that the radiation irradiation is started by the current detection circuit 120 and the detecting circuit 108a is output. Thus, the control circuit 108b supplies the control signal 118 to the drive circuit 102, and the supply of the conductive voltage to the driving wiring G by the drive circuit 102 is stopped. In FIG. 5, the start of the radiation irradiation is detected when the conductive voltage is supplied from the drive circuit 102 to the driving wiring G4 in an initialization operation K2, and the supply of the conductive voltage to the driving wirings G5 to G8 by the drive circuit 102 is not conducted, so that all the switch elements T are maintained in the non-conductive state. According to this, the control is conducted in accordance with the start of the radiation irradiation at a time when the operation by the pixel array 101 is detected so that the initialization operation K2 is ended in the middle of the rows, and the operation by the radiation imaging apparatus 100 is shifted from the preparation operation to an accumulation operation W.

When the end of the radiation irradiation is detected by the current detection circuit 120 and the detecting circuit 108a, the control circuit 108b supplies the control signal 118 to the drive circuit 102. In response to this, the drive circuit 102 outputs the drive signals so that the conductive voltages are sequentially supplied to the respective driving wirings G1 to G8, and all the switch elements T are sequentially set as the conductive state in units of row. The radiation imaging apparatus 100 then performs an image output operation X in which the electric signal in accordance with the emitted radiation is output from the pixel array 101 to the readout circuit 103. With the above-described processing, the radiation imaging apparatus 100 performs the radiation image imaging operation including the preparation operation, the accumulation operation W, and the image output operation X. An operation period of the initialization operation K1 herein is preferably shorter than an operation period of the image output operation X.

The radiation imaging apparatus 100 next performs a dark image imaging operation. The dark image imaging operation includes the preparation operation including the initialization operation K1 conducted once or more and the initialization operation K2, the accumulation operation W, and a dark image output operation F similarly as in the radiation image imaging operation. The radiation is not emitted in the accumulation operation W in the dark image imaging operation. In the dark image output operation F, the electric signal based on a dark-time output derived from a dark current generated in the conversion element S is output from the pixel array 101 to the readout circuit 103, and the operation itself of the radiation imaging apparatus 100 is the same as the image output operation X.

Second Exemplary Embodiment

Figure 6:
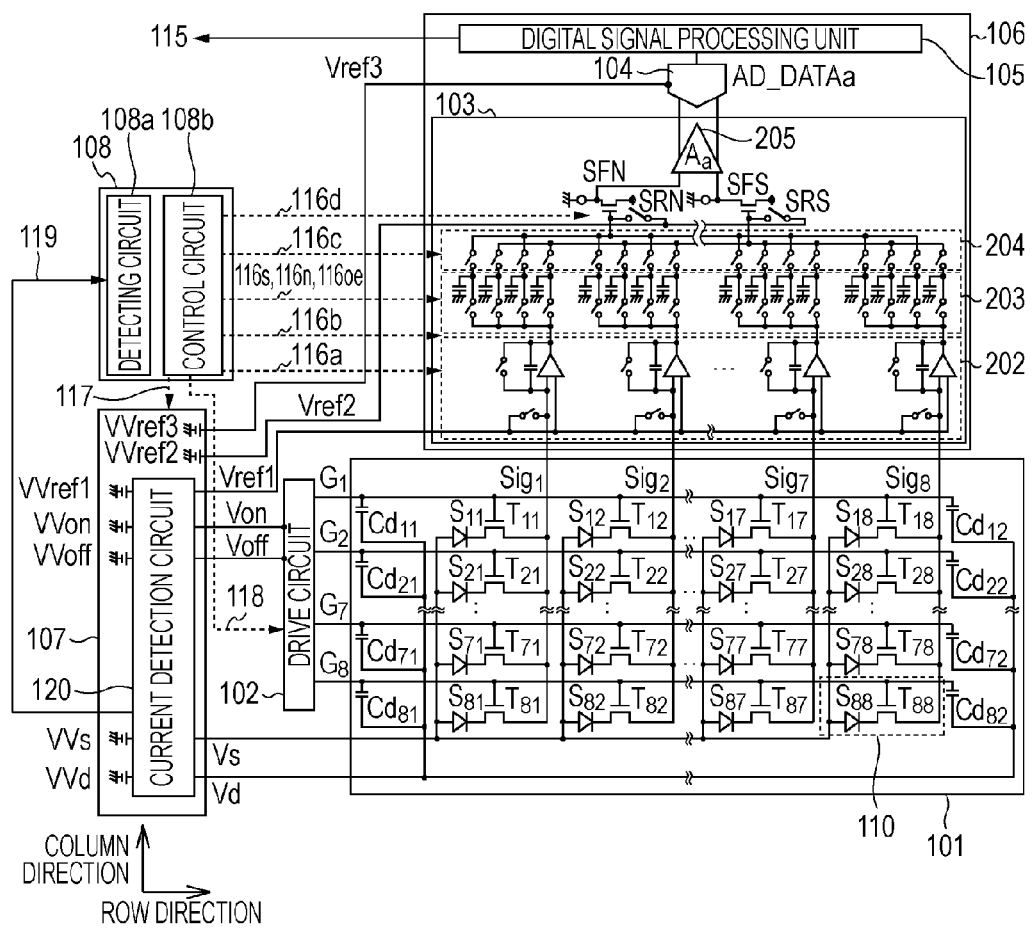
FIG. 6 is a schematic equivalent circuit diagram of a radiation imaging apparatus according to a second exemplary embodiment.

The radiation imaging apparatus 100 according to a second exemplary embodiment of the present invention will be described by using FIG. 6. Configurations that are same as the configurations described according to the first exemplary embodiment are assigned by the same reference signs, and a detailed description thereof will be omitted.

According to the second exemplary embodiment, a capacity wiring Vd having capacity coupling via the drive wiring G and a capacity cd is arranged in the pixel array 101 in addition to the configuration of the first exemplary embodiment. The power supply unit 107 further includes a capacity power source VVd that supplies a constant voltage to the capacity wiring Vd, and the current detection circuit 120 may further detect a capacity wiring current I_Vd flowing through the capacity wiring Vd. Since the current depending on a parasitic capacity of the switch element T in the pixel 110 is detected according to the first exemplary embodiment, if the parasitic capacity is increased to increase the current detecting performance, the operation speed of the switch element T is decreased. On the other hand, according to the present exemplary embodiment, since the capacity wiring Vd is arranged separately other than the wiring connected to the conversion element S or the switch element T, an advantage is attained that the capacity value of the capacity Cd may be arbitrarily set. With regard to the value of the capacity Cd, since the larger current flows as the capacity value is higher, the current detecting performance is increased, and the current measurement accuracy is increased. However, if the value of the capacity Cd is too high, a time constant of the drive wiring G is high, and the drive signal is rounded so that the operation speed of the switch element T is decreased. For that reason, the capacity value is preferably set as a value at which a balance of the sensitivity and the switching speed is achieved.

With respect to the capacity wiring Vd described above, the capacity wiring current I_Vd that flows when the conductive state and the non-conductive state of the switch element T are switched flows in the same direction as the bias wiring current I_Vs and the signal wiring current I_Vref1. For that reason, it is possible to conduct the computation processing similarly as in the bias wiring current I_Vs and the signal wiring current I_Vref1.

Third Exemplary Embodiment

Figure 7A:
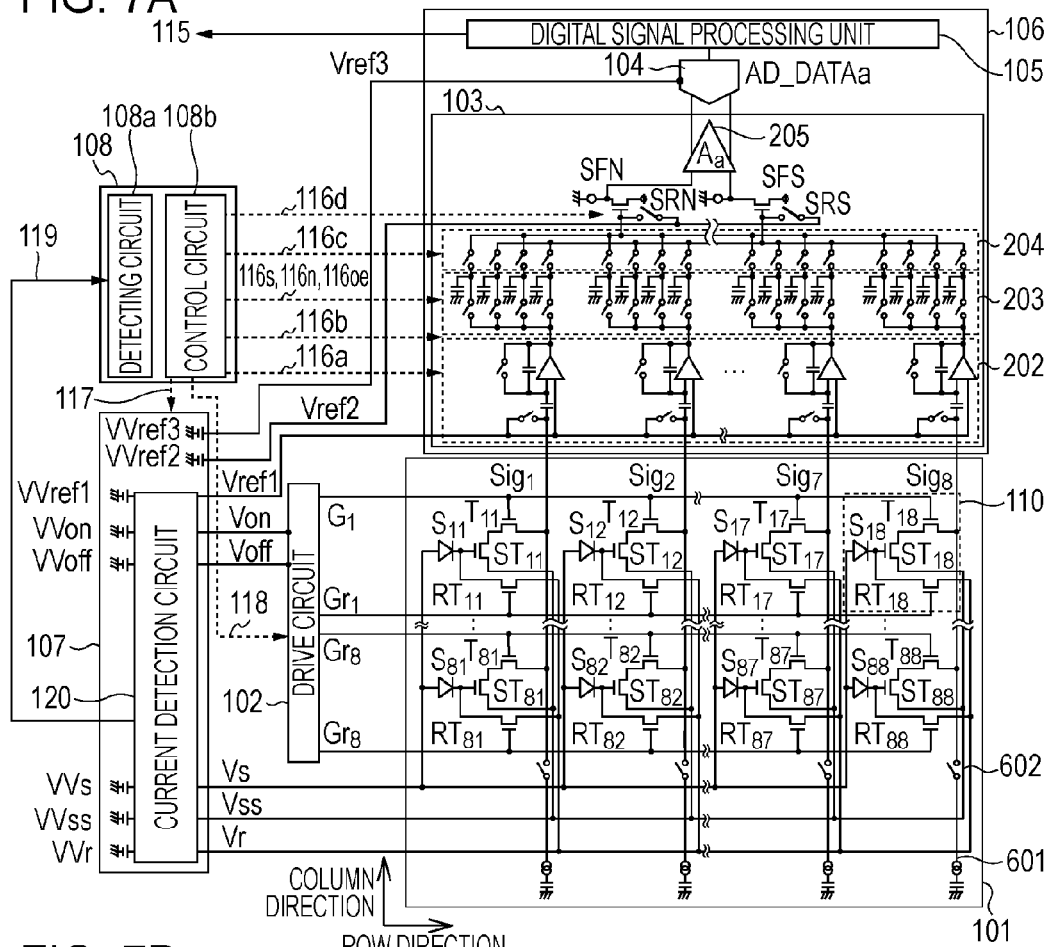
FIG. 7A and FIG. 7B are schematic equivalent circuit diagrams of a radiation imaging apparatus according to a third exemplary embodiment.
Figure 7B:
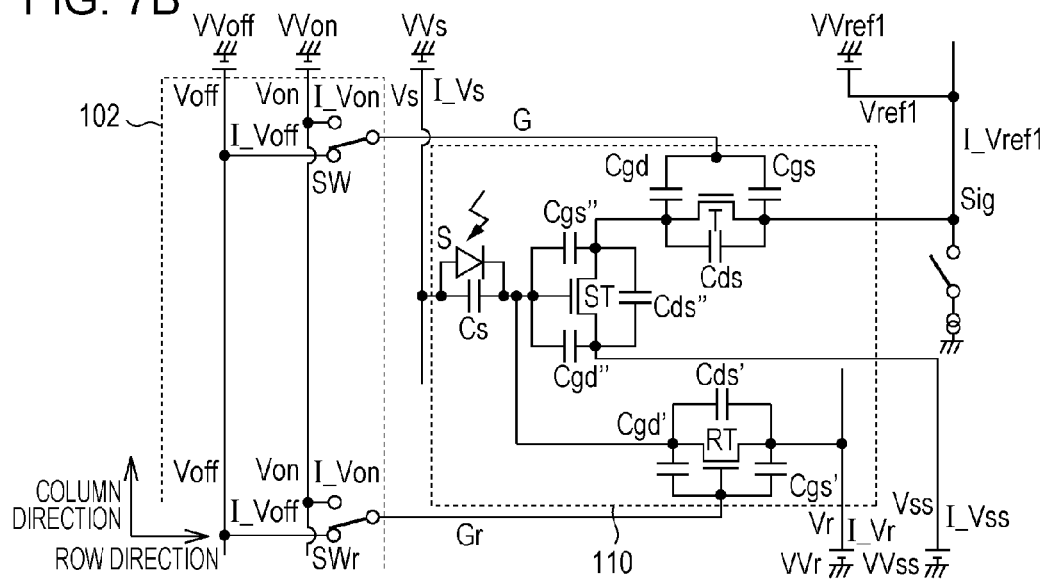

The radiation imaging apparatus 100 according to a third exemplary embodiment of the present invention will be described next by using FIG. 7A and FIG. 7B. Configurations that are same as the configurations described according to the first exemplary embodiment are assigned by the same reference signs, and a detailed description thereof will be omitted.

The pixel 110 further includes the amplification element ST and the reset element RT in addition to the configuration of the one pixel according to the first exemplary embodiment according to the third exemplary embodiment. A transistor including a control terminal (gate terminal) and two main terminals is used for the amplification element ST according to the present exemplary embodiment. The control terminal of the transistor is connected to one of the electrodes of the conversion element S. One of the main terminals is connected to the switch element T. The other main terminal is connected to an operation power supply VVss that supplies an operation voltage via an operation power supply wiring VVs. A constant current source 601 is connected to the signal wiring Sig via a switch 602 and constitutes a source follower circuit with the amplification element ST. A transistor including a control terminal (gate electrode) and two main terminals is used for the reset element RT. One of the main terminals is connected to a reset power supply VVr via a reset wiring Vr. The other main terminal is connected to the control electrode of the amplification element ST. The control electrode of the reset element RT is connected to the drive circuit 102 via a reset driving wiring Gr similarly as in the driving wiring G. The reset driving wiring Gr is selectively connected, through a switch SWr provided to the drive circuit 102, to the conductive power supply VVon via the conductive voltage wiring Von and to the non-conductive power supply VVoff via the non-conductive voltage wiring Voff. A clamp capacity is provided between the inverting input terminal of the operational amplifier A and the signal wiring reset switch SRes.

In the above-described configuration, the currents flow through the respective wirings similarly as in the first exemplary embodiment. An operation power supply wiring current I_Vss flows through an operation power supply wiring Vss, a reset wiring current I_Vr flows through the reset wiring Vr, and a reset drive wiring current I_Vgr flows through the reset drive wiring Gr. By detecting at least two currents among these currents and conducting the computation, it is possible to increase the signal amount while the noise component contained in the detected current is suppressed. The switch 602 herein is preferably set as the non-conductive state when the operation power supply wiring current I_Vss is detected by the control unit 108.

Fourth Exemplary Embodiment

Figure 8A:
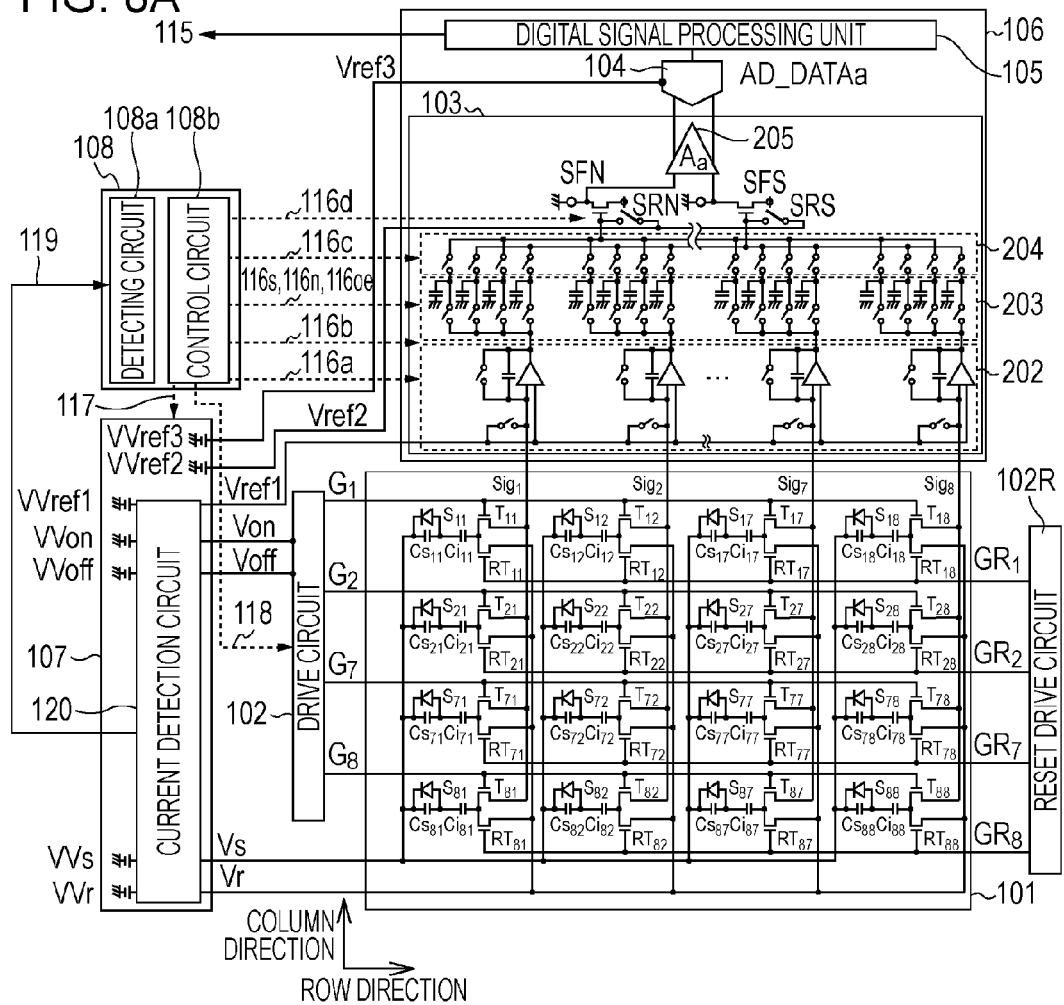
FIG. 8A and FIG. 8B are schematic equivalent circuit diagrams of a radiation imaging apparatus according to a fourth exemplary embodiment.
Figure 8B:
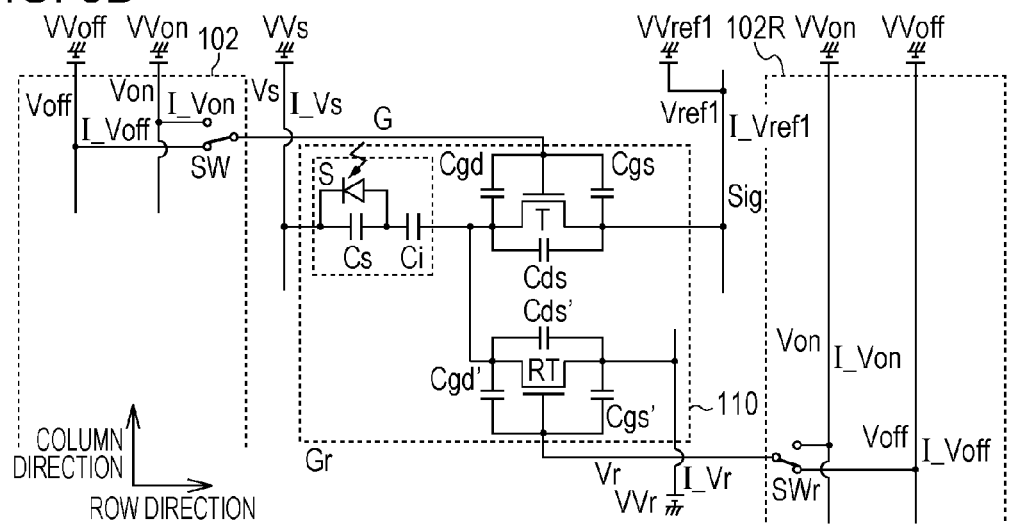

The radiation imaging apparatus 100 according to a fourth exemplary embodiment of the present invention will be described next by using FIG. 8A and FIG. 8B. Configurations that are same as the configurations described according to the first exemplary embodiment are assigned by the same reference signs, and a detailed description thereof will be omitted.

According to the present exemplary embodiment, the pixel 110 further includes the reset element RT in addition to the single pixel configuration according to the first exemplary embodiment. A transistor including a control terminal (gate electrodes) and two main terminals is used for the reset element RT. One of the main terminals is connected to the reset power supply VVr via the reset wiring Vr, and the other main terminal is connected to the control electrode of the amplification element ST. The reset element RT is equivalent to the second switch element according to the exemplary embodiment of the present invention, and a voltage of the reset power supply VVr is equivalent to the second voltage according to the exemplary embodiment of the present invention. The control electrode of the reset element RT is connected to a reset drive circuit 102R via the reset driving wiring Gr. The reset driving wiring Gr is selectively connected, through the switch SWr provided to the reset drive circuit 102R, to the conductive power supply VVon via the conductive voltage wiring Von or to the non-conductive power supply VVoff via the non-conductive voltage wiring Voff. The conversion element S includes an MIS-type photoelectric conversion element according to the present exemplary embodiment.

In the above-described configuration, the currents flow through the respective wirings similarly as in the first exemplary embodiment. The reset wiring current I_Vr flows through the reset wiring Vr, and the reset drive wiring current I_Vgr flows through the reset drive wiring Gr. By detecting at least two currents among these currents and conducting the computation, it is possible to increase the signal amount while the noise component contained in the detected current is suppressed.

The respective exemplary embodiments of the present invention may also be realized while a computer included in the control unit 108 or a control computer 140, for example, executes a program. A unit configured to supply the program to the computer, for example, a computer-readable recording medium such as a CD-ROM on which the program is recorded or a transmission medium such as the internet may also be applied to the exemplary embodiments of the present invention. The program may also be applied to the exemplary embodiments of the present invention. The program, the recording medium, the transmission medium, and the program product are included in the scope of the present invention. A technology based on a readily conceivable combination from the first to fourth exemplary embodiments is also in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-085497 filed Apr. 4, 2012, which is hereby incorporated by reference herein in its entirety.

What is claimed is:
1. A radiation imaging apparatus comprising:
a pixel array including a plurality of pixels arranged in a matrix in which each pixel includes a conversion element configured to convert radiation into a charge and a switch element configured to transfer an electric signal based on the charge;
a plurality of wirings arranged in the pixel array, wherein the plurality of wirings includes a drive wiring through which the switch element is supplied with a signal for controlling a conductive state and a non-conductive state of the switch element, a bias wiring through which the conversion element is supplied with a voltage for the conversion element to convert the radiation into the charge, and a signal wiring through which the electric signal is transferred to a readout circuit; and
a detecting unit configured to detect radiation irradiation to the pixel array,
wherein the detecting unit includes a detecting circuit configured to detect the radiation irradiation to the pixel array on the basis of a plurality of currents flowing through the plurality of wirings detected for each of the plurality of wirings,
wherein the detecting circuit includes a current detection circuit configured to detect the plurality of currents flowing through the plurality of wirings for each of the plurality of wirings,
wherein the current detection circuit detects a current flowing through the bias wiring and a current flowing through the signal wiring, and
wherein the detecting circuit detects the radiation irradiation to the pixel array based on values of the currents detected by the current detection circuit.

2. The radiation imaging apparatus according to claim 1,
wherein the detecting circuit includes a computation circuit configured to compute the value of the current flowing through the bias wiring and the value of the current flowing through the signal wiring and a comparison circuit configured to compare an output of the computation circuit with a threshold and output a comparison result, and
wherein the computation circuit performs a computation in consideration of a direction of the current flowing through the bias wiring, a direction of the current flowing through the signal wiring, and a capacitance ratio of the drive wiring.

3. The radiation imaging apparatus according to claim 1, further comprising:
a drive circuit configured to supply the drive wiring with the signal;
the readout circuit, wherein the readout circuit is configured to read out an image signal based on the electric signal; and
a power supply unit configured to supply the bias wiring with the voltage, supply the drive circuit with a conductive voltage and a non-conductive voltage, and supply the readout circuit with a reference voltage that is different from the voltage.

4. The radiation imaging apparatus according to claim 3, wherein:
the conversion element includes a first electrode, a second electrode, and a semiconductor layer provided between the first electrode and the second electrode;
the switch element transfers the electric signal in accordance with a potential at the first electrode; and
the bias wiring is connected to the second electrode.

5. The radiation imaging apparatus according to claim 4, wherein:
the pixel further includes a second switch element configured to supply the first electrode with a second voltage that is different from the voltage separately other than the switch element; and
the power supply unit supplies the second switch element with the second voltage.

6. A radiation imaging system comprising:
the radiation imaging apparatus according to claim 1; and
a radiation generation apparatus configured to output the radiation.

7. A control method for a radiation imaging apparatus including: a pixel array including a plurality of pixels arranged in a matrix in which each pixel includes a conversion element configured to convert radiation into a charge and a switch element configured to transfer an electric signal based on the charge; a plurality of wirings arranged in the pixel array, wherein the plurality of wirings includes a drive wiring through which the switch element is supplied with a signal for controlling a conductive state and a non-conductive state of the switch element, a bias wiring through which the conversion element is supplied with a voltage for the conversion element to convert the radiation into the charge, and a signal wiring through which the electric signal is transferred to a readout circuit; and a detecting unit configured to detect radiation irradiation to the pixel array, the control method comprising:
detecting a current flowing through the bias wiring and a current flowing the signal wiring;
detecting the radiation irradiation to the pixel array on the basis of the detected current flowing through the bias wiring and the detected current flowing through the signal wiring; and
controlling an operation of the pixel array in accordance with the detected radiation irradiation.

8. A radiation imaging apparatus comprising:
a pixel array including a plurality of pixels arranged in a matrix in which each pixel includes a conversion element configured to convert radiation into a charge and a switch element configured to transfer an electric signal based on the charge;
a plurality of wirings arranged in the pixel array, wherein the plurality of wirings includes a drive wiring through which the switch element is supplied with a signal for controlling a conductive state and a non-conductive state of the switch element, a bias wiring through which the conversion element is supplied with a voltage for the conversion element to convert the radiation into the charge, and a signal wiring through which the electric signal is transferred to a readout circuit; and
a detecting unit configured to detect radiation irradiation to the pixel array,
wherein the detecting unit includes a detecting circuit configured to detect the radiation irradiation to the pixel array on the basis of a plurality of currents flowing through the plurality of wirings detected for each of the plurality of wirings,
wherein the detecting circuit includes a current detection circuit configured to detect the plurality of currents flowing through the plurality of wirings for each of the plurality of wirings,
wherein the current detection circuit detects a current flowing through the drive wiring and a current flowing through the bias wiring, and
wherein the detecting circuit detects the radiation irradiation to the pixel array based on values of the currents detected by the current detection circuit.

9. The radiation imaging apparatus according to claim 8, further comprising:
a drive circuit configured to supply the drive wiring with the signal;
the readout circuit, wherein the readout circuit is configured to read out an image signal based on the electric signal; and
a power supply unit configured to supply the bias wiring with the voltage, supply the drive circuit with a conductive voltage and a non-conductive voltage, and supply the readout circuit with a reference voltage that is different from the voltage.

10. The radiation imaging apparatus according to claim 9, wherein:
the conversion element includes a first electrode, a second electrode, and a semiconductor layer provided between the first electrode and the second electrode;
the switch element transfers the electric signal in accordance with a potential at the first electrode; and
the bias wiring is connected to the second electrode.

11. The radiation imaging apparatus according to claim 10, wherein:
the pixel further includes a second switch element configured to supply the first electrode with a second voltage that is different from the voltage separately other than the switch element; and
the power supply unit supplies the second switch element with the second voltage.

12. A radiation imaging system comprising:
the radiation imaging apparatus according to claim 8; and
a radiation generation apparatus configured to output the radiation.

13. A control method for a radiation imaging apparatus including: a pixel array including a plurality of pixels arranged in a matrix in which each pixel includes a conversion element configured to convert radiation into a charge and a switch element configured to transfer an electric signal based on the charge; a plurality of wirings arranged in the pixel array, wherein the plurality of wirings includes a drive wiring through which the switch element is supplied with a signal for controlling a conductive state and a non-conductive state of the switch element, a bias wiring through which the conversion element is supplied with a voltage for the conversion element to convert the radiation into the charge, and a signal wiring through which the electric signal is transferred to a readout circuit; and a detecting unit configured to detect radiation irradiation to the pixel array, the control method comprising:
   detecting a current flowing through the drive wiring and a current flowing through the bias wiring;
   detecting the radiation irradiation to the pixel array on the basis of the detected current flowing through the drive wiring and the detected current flowing through the bias wiring; and
   controlling an operation of the pixel array in accordance with the detected radiation irradiation.

14. A radiation imaging apparatus comprising:
   a pixel array including a plurality of pixels arranged in a matrix in which each pixel includes a conversion element configured to convert radiation into a charge and a switch element configured to transfer an electric signal based on the charge;
   a plurality of wirings arranged in the pixel array, wherein the plurality of wirings includes a drive wiring through which the switch element is supplied with a signal for controlling a conductive state and a non-conductive state of the switch element, a bias wiring through which the conversion element is supplied with a voltage for the conversion element to convert the radiation into the charge, and a signal wiring through which the electric signal is transferred to a readout circuit; and
   a detecting unit configured to detect radiation irradiation to the pixel array,
   wherein the detecting unit includes a detecting circuit configured to detect the radiation irradiation to the pixel array on the basis of a plurality of currents flowing through the plurality of wirings detected for each of the plurality of wirings,
   wherein the detecting circuit includes a current detection circuit configured to detect the plurality of currents flowing through the plurality of wirings for each of the plurality of wirings,
   wherein the current detection circuit detects a current flowing through the drive wiring, a current flowing through the bias wiring, and a current flowing through the signal wiring, and
   wherein the detecting circuit detects the radiation irradiation to the pixel array based on values of the currents detected by the current detection circuit.

15. The radiation imaging apparatus according to claim 14, further comprising:
   a drive circuit configured to supply the drive wiring with the signal;
   the readout circuit, wherein the readout circuit is configured to read out an image signal based on the electric signal; and
   a power supply unit configured to supply the bias wiring with the voltage, supply the drive circuit with a conductive voltage and a non-conductive voltage, and supply the readout circuit with a reference voltage that is different from the voltage.

16. The radiation imaging apparatus according to claim 15, wherein:
   the conversion element includes a first electrode, a second electrode, and a semiconductor layer provided between the first electrode and the second electrode;
   the switch element transfers the electric signal in accordance with a potential at the first electrode; and
   the bias wiring is connected to the second electrode.

17. The radiation imaging apparatus according to claim 16, wherein:
   the pixel further includes a second switch element configured to supply the first electrode with a second voltage that is different from the voltage separately other than the switch element; and
   the power supply unit supplies the second switch element with the second voltage.

18. A radiation imaging system comprising:
   the radiation imaging apparatus according to claim 14; and
   a radiation generation apparatus configured to output the radiation.

19. A control method for a radiation imaging apparatus including: a pixel array including a plurality of pixels arranged in a matrix in which each pixel includes a conversion element configured to convert radiation into a charge and a switch element configured to transfer an electric signal based on the charge; a plurality of wirings arranged in the pixel array, wherein the plurality of wirings includes a drive wiring through which the switch element is supplied with a signal for controlling a conductive state and a non-conductive state of the switch element, a bias wiring through which the conversion element is supplied with a voltage for the conversion element to convert the radiation into the charge, and a signal wiring through which the electric signal is transferred to a readout circuit; and a detecting unit configured to detect radiation irradiation to the pixel array, the control method comprising:
   detecting a current flowing through the drive wiring, a current flowing through the bias wiring, and a current flowing through the signal wiring;
   detecting the radiation irradiation to the pixel array on the basis of the detected current flowing through the drive wiring, the detected current flowing through the bias wiring, and the detected current flowing through the signal wiring; and
   controlling an operation of the pixel array in accordance with the detected radiation irradiation.

20. A radiation imaging apparatus comprising:
   a pixel array including a plurality of pixels arranged in a matrix in which each pixel includes a conversion element configured to convert radiation into a charge and a switch element configured to transfer an electric signal based on the charge;
   a plurality of wirings arranged in the pixel array, wherein the plurality of wirings includes a drive wiring through which the switch element is supplied with a signal for controlling a conductive state and a non-conductive state of the switch element, a bias wiring through which the conversion element is supplied with a voltage for the conversion element to convert the radiation into the charge, a signal wiring through which the electric signal is transferred to a readout circuit, and a coupling wiring that has capacitance coupling with the drive wiring separately other than the bias wiring and the signal wiring; and a detecting unit configured to detect radiation irradiation to the pixel array, wherein the detecting unit includes a detecting circuit configured to detect the radiation irradiation to the pixel array on the basis of a plurality of currents flowing through the plurality of wirings detected for each of the plurality of wirings, wherein the detecting circuit includes a current detection circuit configured to detect the plurality of currents flowing through the plurality of wirings for each of the plurality of wirings, wherein the current detection circuit detects the plurality of currents including at least a current flowing through the coupling wiring, and wherein the detecting circuit detects the radiation irradiation to the pixel array based on values of the currents detected by the current detection circuit.

21. The radiation imaging apparatus according to claim 20, further comprising:
  a drive circuit configured to supply the drive wiring with the signal;
  the readout circuit, wherein the readout circuit is configured to read out an image signal based on the electric signal; and
  a power supply unit configured to supply the bias wiring with the voltage, supply the drive circuit with a conductive voltage and a non-conductive voltage, and supply the readout circuit with a reference voltage that is different from the voltage.

22. The radiation imaging apparatus according to claim 21, wherein:
  the conversion element includes a first electrode, a second electrode, and a semiconductor layer provided between the first electrode and the second electrode;
  the switch element transfers the electric signal in accordance with a potential at the first electrode; and
  the bias wiring is connected to the second electrode.

23. The radiation imaging apparatus according to claim 22, wherein:
  the pixel further includes a second switch element configured to supply the first electrode with a second voltage that is different from the voltage separately other than the switch element; and
  the power supply unit supplies the second switch element with the second voltage.

24. The radiation imaging apparatus according to claim 23, wherein the coupling wiring is a wiring through which the second voltage is supplied from the power supply unit to the second switch element.

25. A radiation imaging system comprising:
  the radiation imaging apparatus according to claim 20; and
  a radiation generation apparatus configured to output the radiation.

26. A control method for a radiation imaging apparatus including: a pixel array including a plurality of pixels arranged in a matrix in which each pixel includes a conversion element configured to convert radiation into a charge and a switch element configured to transfer an electric signal based on the charge; a plurality of wirings arranged in the pixel array, wherein the plurality of wirings includes a drive wiring through which the switch element is supplied with a signal for controlling a conductive state and a non-conductive state of the switch element, a bias wiring through which the conversion element is supplied with a voltage for the conversion element to convert the radiation into the charge, a signal wiring through which the electric signal is transferred to a readout circuit, and a coupling wiring that has capacitance coupling with the drive wiring separately other than the bias wiring and the signal wiring; and a detecting unit configured to detect radiation irradiation to the pixel array, the control method comprising:
  detecting the plurality of currents including at least a current flowing through the coupling wiring;
  detecting the radiation irradiation to the pixel array on the basis of the detected plurality of currents including at least the detected current flowing through the coupling wiring; and
  controlling an operation of the pixel array in accordance with the detected radiation irradiation.

* * * * *